March 12, 1929.   G. H. S. McNAIR   1,704,756
METHOD OF PROJECTING IMAGES AND APPARATUS THEREFOR
Filed Feb. 17, 1925   2 Sheets-Sheet 1

INVENTOR.
George H. Stauser McNair
BY
Seward Davis
ATTORNEY.

March 12, 1929. G. H. S. McNAIR 1,704,756
METHOD OF PROJECTING IMAGES AND APPARATUS THEREFOR
Filed Feb. 17, 1925 2 Sheets-Sheet 2

Inventor
George H. Stauser McNair
by Denard Davis
ATTORNEY

Patented Mar. 12, 1929.

1,704,756

UNITED STATES PATENT OFFICE.

GEORGE H. STANSER McNAIR, OF ESSEX FELLS, NEW JERSEY.

METHOD OF PROJECTING IMAGES AND APPARATUS THEREFOR.

Application filed February 17, 1925. Serial No. 9,784.

This invention relates to a method of projecting images by reflection and absorption of light and to apparatus therefor, characterized in part by utilization of the optical principles and media disclosed in U. S. Patent No. 1,473,913 to George H. Stanser McNair et al., dated Nov. 13, 1923.

The present invention has for its objects the production of a magnified representation of the indicating elements of a precision instrument; to facilitate easy and accurate readings of visual indicating, measuring and the like devices; and to produce a reflected and magnified image of relatively movable parts within comparatively small compass, that is to say, within dimensional limits otherwise heretofore unattained.

With the above recited objects in view and others as hereinafter pointed out, my invention consists in the following steps; in illuminating an object and its immediate background by light rays caused to fall thereon after passage through a lens element of the divergent class; causing the reflection either of the rays falling upon the object or of the rays falling upon the background, and the absorption of the non-reflected rays; and intercepting the reflected rays by a receiving surface or screen, which may be either translucent or opaque, whereon the image is thereby displayed in silhouette, either as light or dark or conversely, as prearranged, without inversion or substantial loss of definition, and preferably in magnified form as the normal consequence of a divergent lens and a plane reflecting background. As will be readily understood, by substituting a curved in lieu of a plane surface as a background, the reflected image may be dimensionally varied, in that a convex reflecting surface will amplify the normal magnification in accordance with the degree of convexity, and a concave reflecting surface will diminish the normal magnification in accordance with the degree of concavity.

Figure 1:
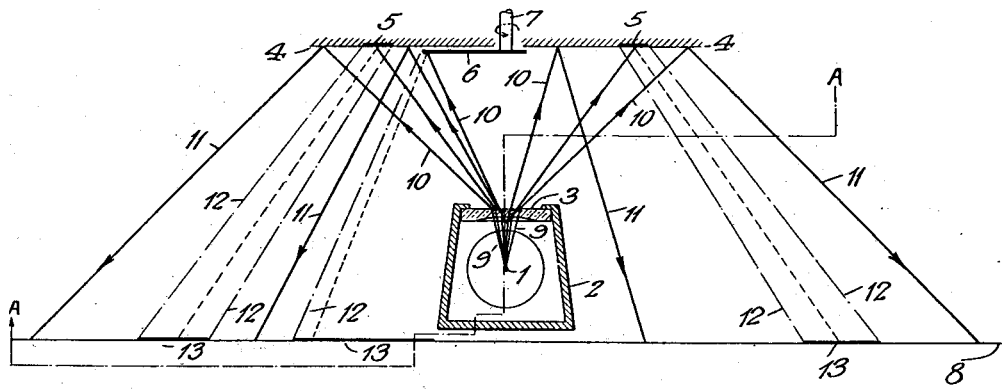
Figure 2:
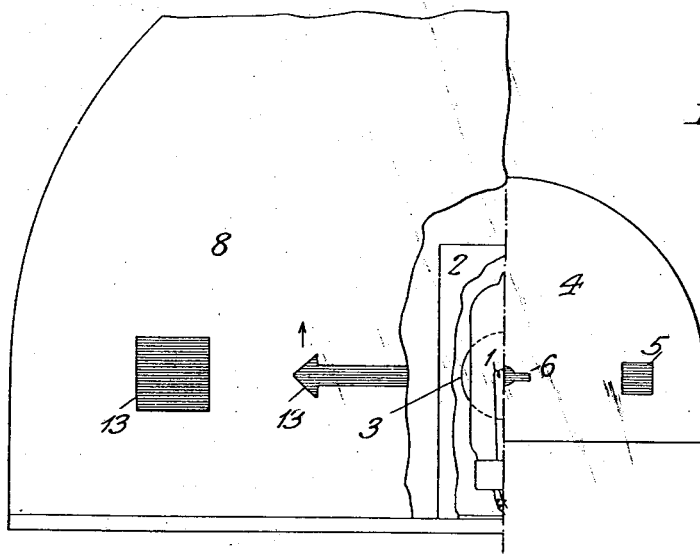
Figure 3:
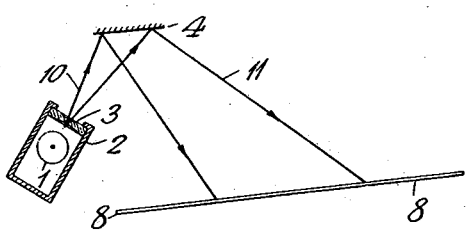
Figure 4:
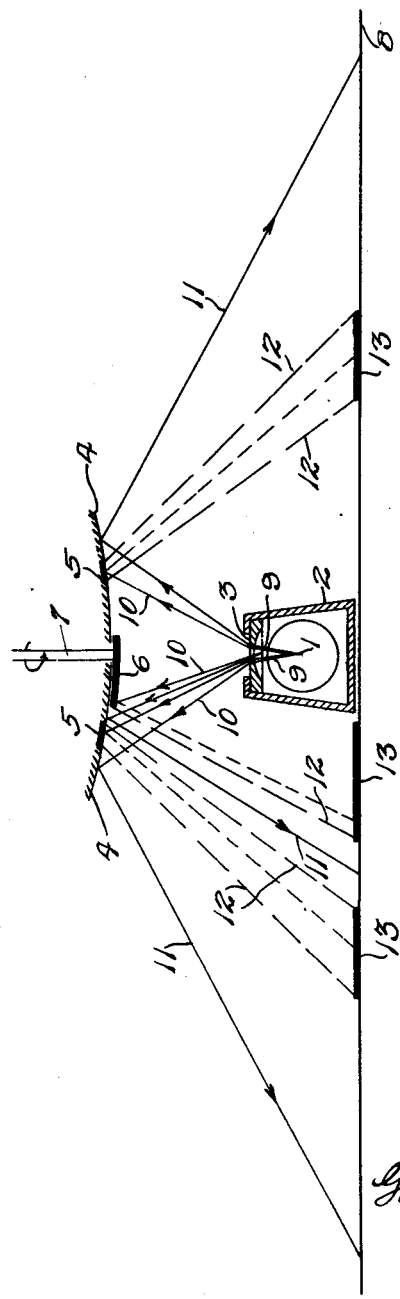

In the accompanying drawings I have illustrated diagrammatically an optical system and the related elements affording the preferred embodiment of means adapted to practice my method, in which Figure 1 is a plan view of the light source, the partially screened double concave lens, the reflecting and the absorbing object-surfaces, and the receiving surface; Figure 2 is a view, partly sectional, perpendicular to the plane of Figure 1, and lying in the several planes indicated by the broken line A—A of Figure 1; Figure 3 is a diagrammatic view, as in Figure 1, showing the projecting elements so placed that the optical axis is angularly disposed relatively to the plane of the reflecting surface; and Figure 4 is a similar view of the same disposition and employing a convex reflecting surface.

Like reference characters indicate like parts throughout the several figures, in which 1 is a concentrated light source, 2 a light proof box, and 3 a lens element of the divergent type; 4, 4 are reflecting surfaces, 5, 5 are stationary non-reflecting surfaces, shown as points of a fixed scale, and 6 is a movable non-reflecting surface, shown as a pointer mounted upon the rotatable shaft 7; 8 is the image-receiving surface. 9, 9 are the light rays emanating from the source 1; 10, 10 are these rays refracted by the lens 3; 11, 11 are the reflected rays; and the interrupted lines 12, 12 indicate the shadows cast as the result of the absorption of the refracted rays 10 falling upon the non-reflecting or shadow-casting surfaces 5, 5, producing the corresponding but magnified image-areas 13, 13 upon the image-receiving surface 8. In Figure 3, the elements 1, 2 and 3 are so disposed angularly relative to the plane surface 4 that the receiving surface 8 is at one side thereof, whereby the masking of any part of the receiving surface by the light proof box is avoided. In Figure 4, the receiving surface 4 is shown as convex, and the divergence of the rays reflected therefrom is increased in correspondence with the degree of curvature of the surface 4, whereby the magnification of the reflecting surface is increased and the image or shadow area received is correspondingly enlarged.

The reflecting surface preferred is a surface which reflects light without material dispersion, such as nitro-silver, quick-silver, speculum metal or stellite.

The advantage results that a small and compact illuminator for dials, and the like, of indicating instruments is possible, permitting precise readings of their scales. The magnified images permit accurate observations from a distance of the relation between the indicating factors.

As will be obvious, the reflecting surface may be interrupted by non-reflecting areas either formed in the plane thereof or superimposed thereon. Thus these light absorptive markings may consist of a hole in the reflecting surface or of a transparence therein; or of an imposed screen. In any case, these will be of any desired configuration. Similarly, screening marks affording the contrast desired will also be obtained by superposing semi-absorptive or semi-obscuring materials upon the light reflecting surfaces. Such transparent or translucent materials may be colored if and as desired, and will of course produce correspondingly colored projections of the image upon the receiving surface.

As above suggested, it is immaterial for the purpose of image casting whether the scale elements have non-reflecting surfaces with the scale background a non-reflecting surface; or whether the scale indicia present reflecting surfaces upon a non-reflecting field. The contrast is the essential.

A particular utility for my method and devices employing same is that afforded by the lecture field. Speakers desiring to demonstrate to their audiencies niceties of measurement by instruments of precision, can project these readings upon a suitable wall of the room without other special apparatus. Thus, in lieu of the auditors filing past the measuring instrument to see and read its indications, all changes and variations in the observed demonstration are visible simultaneously to all. Not only is a simultaneous and continuous observation afforded to all, but a great saving of time is effected as compared with individual examination.

In power and the like installations, numerous meters require constant observation. It is not usually possible to assemble all these conveniently at a single place in a station within eye-range. By use of devices employing my invention, it is practicable to read all meters and the like from one point of observation with otherwise unaided vision.

Other features of utility and advantage will occur to those employed in the commercial and practical application of the arts and sciences requiring inspection and observation of the forces acting and measurement of the magnitudes of those forces.

The particular embodiment of means for the realization of my improved method of projecting images by magnified reflection is not of moment. In Figures 1, 2 and 4 there is shown a rotating pointer as typical of the moving element of an indicating scale, but it is immaterial, obviously, which indicating element moves so long as change of relative position occurs between a fixed and a movable element.

By the phrase "reflecting surface" as above employed, I intend to define the reflecting surface to be used as one adapted to reflect such an amount of the light received thereon as will produce the result desired. As will be obvious, the best results will be attained by the maximum reflective power.

Having thus described my invention, I claim as new:

1. The method of projecting an image consisting in increasing the divergence of the rays from a concentrated light source, receiving a part of these divergent rays upon a surface having adjacent areas, one of which is the object to be projected, one of said areas being of light reflective and one of light absorptive capacity; and receiving upon a second surface the reflected rays.

2. In an optical projector, a light source, an apertured housing therefor screening said source, a lens of the diverging type mounted in the aperture in said housing, a reflecting surface situated in the optical path of said lens, and a fixed non-reflecting area upon said reflecting surface, whereby the transmitted rays falling upon the non-reflecting area are absorbed, and those falling upon the reflecting surface are reflected; a moveable non-reflecting surface lying in a plane substantially parallel to that of the reflecting surface and adapted to overlie a portion thereof, and means for moving such non-reflecting surface over said reflecting surface.

3. In an optical projector, a light source, an apertured housing therefor screening said source, a lens of the divergent type mounted in the aperture in said housing, a reflecting surface situated in the optical path of said lens, and a fixed non-reflecting area upon said reflecting surface, whereby the transmitted rays falling upon the non-reflecting area are absorbed, and those falling upon the reflecting surface are reflected; a moveable non-reflecting surface lying in a plane substantially parallel to that of the reflecting surface and adapted to overlie a portion thereof, means for moving such non-reflecting surface over said reflecting surface, and a screen in the path of the reflected rays adapted to receive same.

4. In an optical projector, a light source, an apertured housing therefor, a lens of the divergent type mounted in the aperture in said housing, a reflecting surface positioned in the optical path of said lens, a plurality of non-reflecting areas upon said reflecting surface, a non-reflecting surface freely moveable over said reflecting surface and means for moving same, and a screen adapted to receive the magnified images of said non-reflecting areas when outlined by the projected rays as reflected from the said reflecting surface.

GEORGE H. STANSER McNAIR.